(12) United States Patent
Yoshimura et al.

(10) Patent No.: US 11,282,307 B2
(45) Date of Patent: Mar. 22, 2022

(54) FLIGHT RESTRICTION SETTING SYSTEM, FLIGHT RESTRICTION SETTING METHOD, AND NON-TRANSITORY STORAGE MEDIUM

(71) Applicant: SUBARU CORPORATION, Tokyo (JP)

(72) Inventors: Kensuke Yoshimura, Tokyo (JP); Masakatsu Abe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 145 days.

(21) Appl. No.: 16/246,266

(22) Filed: Jan. 11, 2019

(65) Prior Publication Data

US 2019/0287322 A1 Sep. 19, 2019

(30) Foreign Application Priority Data

Mar. 15, 2018 (JP) .............................. JP2018-048048

(51) Int. Cl.
*G07C 5/08* (2006.01)
*B64D 45/00* (2006.01)

(52) U.S. Cl.
CPC ........... *G07C 5/0816* (2013.01); *B64D 45/00* (2013.01); *G07C 5/0808* (2013.01); *B64D 2045/0085* (2013.01)

(58) Field of Classification Search
CPC .... G07C 5/0816; G07C 5/0808; B64D 45/00; B64D 2045/0085
See application file for complete search history.

(56) References Cited

U.S. PATENT DOCUMENTS

| 5,182,449 | A | * | 1/1993 | Johnson | G01D 5/268 |
| | | | | | 250/227.14 |
| 9,561,863 | B2 | * | 2/2017 | Conrad | B64D 45/00 |
| 2008/0097728 | A1 | * | 4/2008 | Delaplace | B64F 5/60 |
| | | | | | 703/1 |
| 2009/0292409 | A1 | * | 11/2009 | Cordova | G07C 5/08 |
| | | | | | 701/8 |
| 2010/0235109 | A1 | * | 9/2010 | Zhao | G06Q 10/20 |
| | | | | | 702/34 |
| 2011/0245999 | A1 | | 10/2011 | Kordonowy | |
| 2013/0060405 | A1 | | 3/2013 | Komatsuzaki et al. | |

(Continued)

FOREIGN PATENT DOCUMENTS

JP H6-336199 A 12/1994
JP H10-167194 A 6/1998

(Continued)

OTHER PUBLICATIONS

Japanese Office Action issued in Japanese Application No. 2018-048048 dated Dec. 3, 2019, with English translation.

*Primary Examiner* — Rami Khatib
*Assistant Examiner* — Gabriel J Lambert
(74) *Attorney, Agent, or Firm* — Troutman Pepper Hamilton Sanders LLP

(57) ABSTRACT

A flight restriction setting system includes a damage detector and a flight restriction calculator. The damage detector is configured to detect damage caused to a structure constituting an aircraft. The flight restriction calculator is configured to set flight restriction on the aircraft according to a degree of the damage detected by the damage detector.

16 Claims, 6 Drawing Sheets

(56) References Cited

U.S. PATENT DOCUMENTS

| | | | | |
|---|---|---|---|---|
| 2016/0125107 A1* | 5/2016 | Druckman | ............... | G06F 30/23 |
| | | | | 703/2 |
| 2017/0168021 A1* | 6/2017 | Van Tooren | ......... | G01N 29/041 |
| 2017/0283085 A1* | 10/2017 | Kearns | ...................... | B64F 5/60 |
| 2017/0291722 A1* | 10/2017 | Owens | .................. | G07C 5/0808 |
| 2017/0313436 A1* | 11/2017 | Lamberti | ................ | G01N 27/20 |
| 2017/0358153 A1* | 12/2017 | Tucker | ...................... | B64F 5/60 |
| 2018/0002039 A1* | 1/2018 | Finn | ..................... | G07C 5/0808 |
| 2018/0165898 A1* | 6/2018 | Isom | ........................ | B64C 27/32 |
| 2018/0327112 A1* | 11/2018 | Huth | ..................... | G01L 1/2262 |
| 2019/0204854 A1 | 7/2019 | Yoshimura | | |
| 2019/0287322 A1* | 9/2019 | Yoshimura | .............. | B64D 45/00 |
| 2020/0198770 A1* | 6/2020 | Wulff | .................... | B64C 13/503 |

FOREIGN PATENT DOCUMENTS

| | | |
|---|---|---|
| JP | 6374609 B1 | 7/2018 |
| WO | 2011/155020 A1 | 12/2011 |
| WO | 2015/160945 A1 | 10/2015 |

\* cited by examiner

----- SOUND STATE
——— DAMAGED STATE

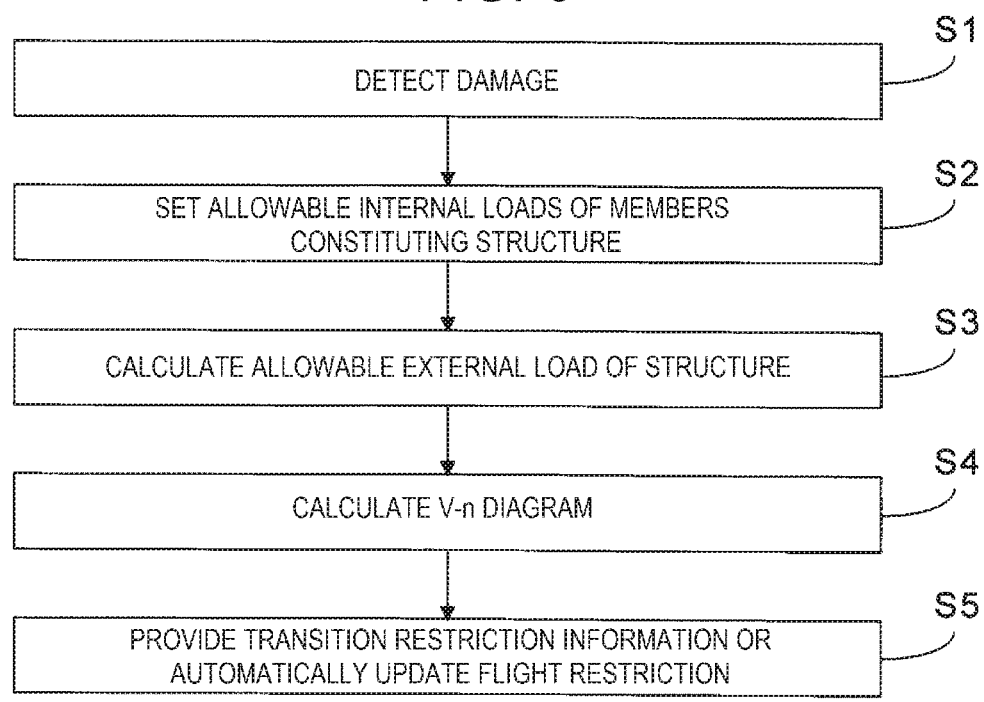

FLIGHT RESTRICTION SETTING SYSTEM, FLIGHT RESTRICTION SETTING METHOD, AND NON-TRANSITORY STORAGE MEDIUM

CROSS-REFERENCE TO RELATED APPLICATIONS

The present application claims priority from Japanese Patent Application No. 2018-048048 filed on Mar. 15, 2018, the entire contents of which are hereby incorporated by reference.

BACKGROUND

Technical Field

The present invention relates to a flight restriction setting system, a flight restriction setting method, and a flight restriction setting program.

Related Art

In the operation of an aircraft, it is important for safety to detect damage in a structure constituting the aircraft and restrict flight conditions such as an altitude, a speed, and a load factor when having detected damage. For that purpose, a system that detects damage in a structure of an aircraft and changes the control characteristics of the aircraft when having detected damage has been proposed (see, for instance, Japanese Unexamined Patent Application Publication (JP-A) No. 6-336199). In addition, a technique for determining the position and the degree of damage caused to a control surface has been proposed as a related technique (see, for instance, JP-A No. 10-167194).

SUMMARY OF THE INVENTION

An aspect of the present invention provides a flight restriction setting system a including a damage detector and a flight restriction calculator. The damage detector detects damage caused to a structure constituting an aircraft. The flight restriction calculator sets flight restriction on the aircraft according to the degree of the damage detected by the damage detector.

An aspect of the present invention provides a flight restriction setting method including detecting damage caused to a structure constituting an aircraft, using a damage detector, and setting flight restriction on the aircraft according to a degree of the damage detected by the damage detector.

An aspect of the present invention provides a non-transitory storage medium that includes a flight restriction setting program embodied in the medium. The restriction setting program causes, when executed by a computer, the computer to implement a process. The process includes obtaining damage caused to a structure constituting an aircraft from a damage detector, the damage being detected by the damage detector, and setting flight restriction on the aircraft according to a degree of the obtained damage.

An aspect of the present invention provides a flight restriction setting system comprising circuitry. The circuitry is configured to detect damage caused to a structure constituting an aircraft. The circuitry is configured to set flight restriction on the aircraft according to a degree of the damage detected.

BRIEF DESCRIPTION OF THE DRAWINGS

FIG. 6 is a flowchart illustrating an instance of operation of the flight restriction setting system illustrated in FIG. 1.

DETAILED DESCRIPTION

A flight restriction setting system, a flight restriction setting method, and a flight restriction setting program according to an example of the present invention will be described with reference to the attached drawings.

It is desirable to provide appropriate flight restriction when damage is caused to a structure of an aircraft.

First Example (Structure and Function)

Figure 1:
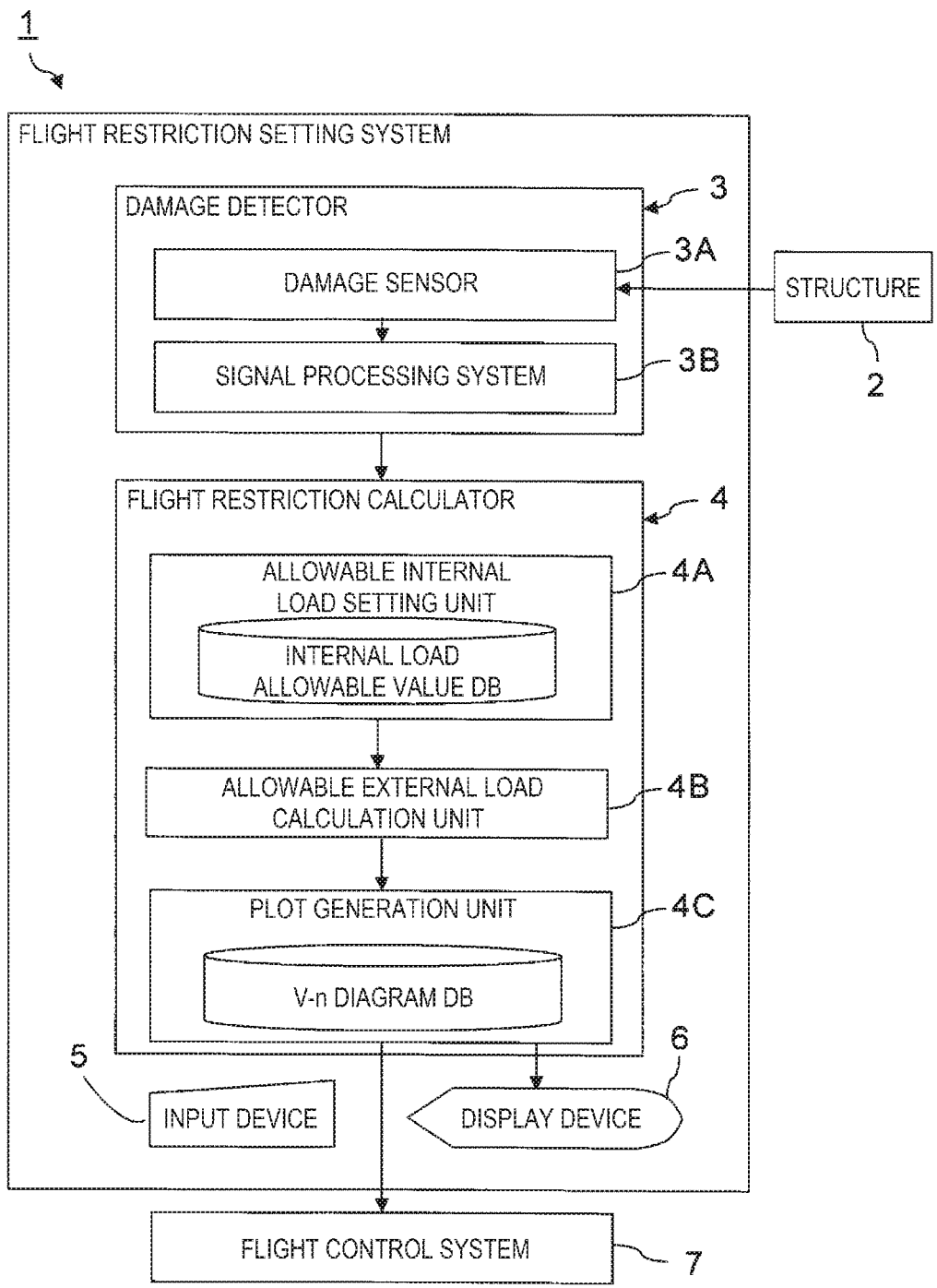
FIG. 1 is a structural diagram illustrating a flight restriction setting system according to an example of the present invention.

FIG. 1 is a structural diagram illustrating a flight restriction setting system according to an example of the present invention.

A flight restriction setting system 1 monitors the presence or absence of damage in a structure 2 constituting an aircraft and, when having detected damage, sets flight restriction on the aircraft according to a degree of the damage. The flight restriction setting system 1 includes a damage detector 3, a flight restriction calculator 4, an input device 5, and a display device 6. It should be noted here that the input device 5 and the display device 6 may be provided in the aircraft.

The damage detector 3 is a system that monitors the presence or absence of damage in the structure 2 constituting an aircraft and detects damage caused to the structure 2. In addition, the damage detector 3 is configured to be able to detect not only the presence or absence of damage, but also the area of occurrence or the position of damage and the size of damage. Therefore, the damage detector 3 includes at least a damage sensor 3A that detects damage caused to the structure 2 and a signal processing system 3B that processes a detection signal from the damage sensor 3A.

Any method can be adopted as the detection method for damage. For instance, damage can be detected by disposing a plurality of strain sensors as the damage sensor 3A in the structure 2 and obtaining the distribution of strain generated in the structure 2. In this case, the presence and the position of damage can be identified as singular points by performing threshold processing on the distribution of strain. A singular point may be detected based on a relative value with respect to the strain amount in another position using a threshold empirically determined in advance or can be detected based on the absolute value of the strain amount.

Alternatively, damage may also be detected by mounting an ultrasonic oscillator to the structure 2 and propagating ultrasound through the structure 2. In this case, by comparing the waveform of ultrasound when no damage is present with the waveform of ultrasound after damage is caused, occurrence of damage can be determined when the change amount of the waveform of ultrasound is equal to or more than the threshold empirically determined in advance.

In addition, any method can also be adopted as the detection method for the position of damage using ultrasound. As a specific instance, by disposing a plurality of ultrasound sensors as the damage sensor 3A in the structure 2 and, based on the distribution of the waveforms of ultrasound detected by the plurality of ultrasound sensors, the position of damage can be identified as a singular point having a large change amount. As another specific instance, when damage is detected, the position of damage may be identified by performing detailed damage inspection using the reflected wave of ultrasound. That is, based on the reception timing of the reflected wave of ultrasound reflected by damage, the distance from the ultrasonic oscillator to the damage or the distance from the damage to the ultrasound sensor can be measured.

An appropriate sensor is selected as the damage sensor 3A provided in the damage detector 3 according to a physical quantity used to detect damage. For instance, when ultrasound is used to detect damage, an ultrasound resonator or an optical fiber sensor is provided as the damage sensor 3A in the damage detector 3. Alternatively, when a strain amount is detected, an optical fiber sensor or the like is provided as a strain sensor in the damage detector 3.

Typical optical fiber sensors are a fiber Bragg grating (FBG) sensor and a phase shifted FBG (PS-FBG) sensor. When an optical fiber sensor is used as the damage sensor 3A, optical devices such as a light source and an optical filter and a photoelectric transfer circuit are also provided in the damage detector 3. In addition, an optical device that performs signal processing of an optical signal may be provided in the damage detector 3.

On the other hand, the signal processing system 3B constituting the damage detector 3 may be implemented by a circuit. As a practical instance, the signal processing system 3B may be implemented by an A/D (analog-to-digital) converter that converts a detection signal that is a physical quantity output as an analog electric signal from a photoelectric transfer circuit coupled to the output side of the damage sensor 3A such as an ultrasound resonator or an optical fiber sensor to a digital electric signal and a computer to which a program has been read.

In addition, when signal processing such as filtering processing or averaging processing for the purpose of noise removal or the like is performed on an electric signal, a circuit required for the signal processing may be coupled when the signal processing is performed on an analog signal or the function of signal processing may be provided for a computer by reading a signal processing program to the computer when the signal processing is performed on a digital signal.

The flight restriction calculator 4 may be implemented by a circuit such as a computer to which a program has been read. Accordingly, the flight restriction calculator 4 may be integrated with the signal processing system 3B of the damage detector 3. In addition, a flight restriction setting program that causes a computer to function as the flight restriction calculator 4 may be stored in an information recording medium so as to be distributed as a program product.

The flight restriction calculator 4 has the function of automatically setting flight restriction on an aircraft according to the degree of damage detected by the damage detector 3. For this purpose, the flight restriction calculator 4 has an allowable internal load setting unit 4A, an allowable external load calculation unit 4B, and a plot generation unit 4C.

The allowable internal load setting unit 4A has the function of setting the allowable ranges of internal loads applicable to the structural members constituting the structure 2 after occurrence of damage based on the position and the size of the damage detected by the damage detector 3.

The allowable ranges of the internal loads applicable to the structural members constituting the structure 2 can be determined in advance for each position and size of damage that may be caused to the structure 2. That is, it is possible to create, in advance, information such as a table or a function that represents the relationship between the position and the size of damage that may be caused to the structure 2 and the allowable ranges of the internal loads applicable to the structural members constituting the structure 2. In addition, it is possible to create a database in which information representing the relationship between the position and the size of damage that may be caused to the structure 2 and the allowable ranges of internal loads of the structure 2 is stored in a storage device.

The allowable internal load setting unit 4A is provided with an internal load allowable value database in which the position and the size of damage that may be caused to the structure 2 is associated with the allowable ranges of internal loads of the structure 2. Therefore, when damage is caused to the structure 2, the allowable range of the internal load of the structure 2 that depends on the position and the size of the damage can be obtained with reference to the internal load allowable value database. It should be noted here that the different allowable ranges of the internal loads may be set according to the degree of damage. In this case, the allowable ranges of the internal loads of structural members are determined for each degree of damage, the degree of damage is associated with the allowable ranges of internal loads of the structural members, and the associated information is stored in the internal load allowable value database.

This enables the allowable internal load setting unit 4A to update the allowable value of the internal load of the structural member having suffered damage from the allowable value of the internal load before suffering damage set by default to the allowable value of the internal load that depends on the position and the size of the damage.

It should be noted here that the Young's moduli and geometries of the structural members constituting the structure 2 of the aircraft are calculated based on the internal loads that may be applied to the structural members constituting the structure 2 when the structural members constituting the structure 2 are designed. That is, when the structural members constituting the structure 2 are designed, the criteria (references) such as the stiffness, the allowable strain, and the allowable buckling required for the structural members are set based on the internal loads applicable to the structural members and the Young's moduli, geometries, and the like of the structural members are designed according to the set criteria.

Accordingly, the calculation of the allowable ranges of the internal loads applicable to the members constituting the structure 2 is the reverse calculation of the calculation of the Young's moduli, the geometries, and the like of the structural members during design. That is, the allowable ranges of the internal loads of the structural members constituting the structure 2 having suffered damage can be calculated based on stiffness parameters and geometric parameters such as the Young's moduli and geometries of the structural members designed according to the criteria such as the stiffness, the allowable strain, and the allowable buckling required for the structural members.

The allowable external load calculation unit 4B has the function of calculating the allowable range of the external load applicable to the structure 2 after occurrence of damage based on the allowable ranges of the internal loads applicable to the structural members constituting the structure 2 after occurrence of damage. The allowable range of the external load may be the allowable range of at least one of the distribution of a shearing force, the distribution of a bending moment, or the distribution of a twisted torque.

The allowable range of the external load to the structure 2 can be obtained by convergence calculation that repeats the calculation for obtaining the internal loads of the structure 2 using the external load to the structure 2 as input data until the internal load falls within the allowable range while gradually reducing the external load. That is, based on the allowable ranges of the internal loads applicable to the structural members constituting the structure 2 after occurrence of damage, the allowable range of the external load applicable to the structure 2 after occurrence of damage can be calculated by convergence calculation that repeats the calculation for calculating the internal loads applied to the members constituting the structure 2 when the external load is applied to the structure 2 until the internal loads fall within the allowable ranges while reducing the external load.

The calculation of the internal loads based on the external load to the structure 2 having suffered damage can be performed by finite element method (FEM) analysis that uses a calculation expression for the internal loads of the structure 2 that simulates damage or finite element method (FEM) analysis that uses an analysis model of the structure 2 that simulates damage.

Figure 2A:
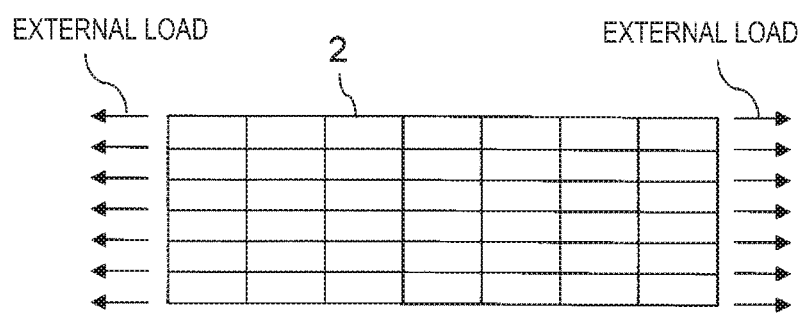
FIGS. 2A and 2B illustrate instances of models of a structure in a sound state in which no damage is present and a structure that simulates damage.
Figure 2B:
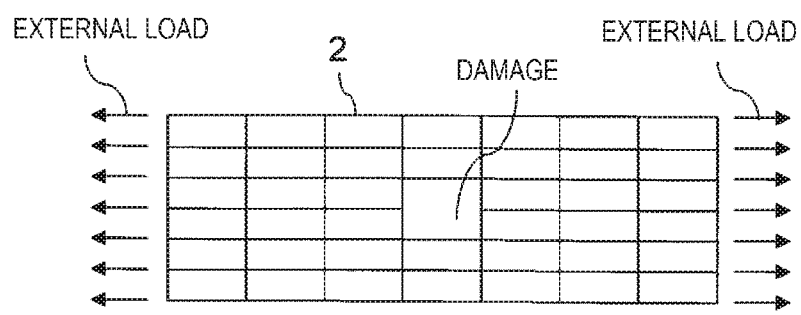

FIGS. 2A and 2B illustrate instances of models of the structure 2 in a sound state in which no damage is present and the structure 2 that simulates damage.

FIG. 2A illustrates an instance of the model of the structure 2 in a sound state in which no damage is present. When the internal loads of the structure 2 are calculated by FEM analysis, an analysis model of the structure 2 can be created as an FEM model including a plurality of divided elements as illustrated in FIG. 2A. However, when the internal loads are calculated using the calculation expression for calculating the internal loads of the structure 2 without division into a plurality of elements, the model of the structure 2 is not necessarily divided into a plurality of elements unlike FIG. 2A.

In contrast, FIG. 2B illustrates an instance of the model of the structure 2 when the structure 2 has suffered damage. As illustrated in FIG. 2B, a model in which the part having suffered damage has been removed can be used to simulate the structure 2 having suffered damage. That is, damage can be simulated as a loss of the structural member. Alternatively, damage may also be simulated by reducing the parameter representing stiffness such as the Young's modulus corresponding to the part having suffered damage.

When the internal loads of the structure 2 are calculated by FEM analysis in the model of the structure 2 that simulates damage, an analysis model of the structure 2 can be created as an FEM model including a plurality of divided elements, as illustrated in FIG. 2B. In contrast, when the internal loads are calculated using the calculation expression for calculating the internal loads of the structure 2 without division into a plurality of elements, the model of the structure 2 is not necessarily divided into a plurality of elements unlike FIG. 2B.

When the internal loads of the structure 2 having suffered damage are obtained by calculation expressions without using FEM analysis, by assigning geometric parameters such as the thickness, the width, the height, and the like and stiffness parameters such as Young's moduli and the like to the calculation expressions for internal loads of the structural members such as the upper surface skin, the lower surface skin, the front spar web, the rear spar web, the front spar upper and lower surface chords, and the rear spar upper and lower surface chords, the internal loads of the structural members, such as a shearing force and an axial force can be obtained. That is, the internal load of the structural member having suffered damage can be obtained based on the calculation expressions for the internal loads of the structure 2.

In contrast, when the internal loads of the structure 2 having suffered damage are obtained by FEM analysis, the internal loads of the structure 2 having suffered damage can be obtained similarly by FEM analysis targeted for an FEM model of the structure 2 that simulates damage.

The internal loads of the structure 2 having suffered damage change from the internal loads of the structure 2 in a sound state. Specifically, when the internal loads of the structure 2 are calculated using the same external load as the external load used to calculate the internal loads of the structure 2 in a sound state, the internal load of the structural member around a damaged part becomes high locally. Accordingly, the internal loads of the structure 2 having suffered damage may exceed the allowable ranges unless the allowable external load is reduced.

Therefore, the external load that is input data for calculating the internal loads of the structure 2 having suffered damage is set to a value smaller by a predetermined change amount and the internal loads of the structure 2 having suffered damage are calculated again. Since the external load is reduced in this case, the internal loads of the structure 2 having suffered damage are also reduced. Accordingly, by repeating reduction in the external load and calculation of the internal loads, the external load when the internal loads of the structure 2 having suffered damage fall within the allowable ranges of the internal loads of the structure 2 having suffered damage can be obtained. That is, by repeating the setting of the external load that becomes input data to a small value, the calculation of the internal loads corresponding to the set external load, and the determination whether the internal loads in all portions obtained as the result of the calculation fall within the allowable ranges, it is possible to obtain the distributions of the internal loads of the structure 2 within the allowable ranges and the external load when the distributions of the internal loads of the structure 2 within the allowable ranges are obtained.

Then, the distribution of a shearing force, the distribution of a bending moment, and the distribution of a twisted torque when the distribution of the internal loads of the structure 2 within the allowable range is obtained can be set within the allowable range of the external load of the structure 2 having suffered damage.

Figure 3A:
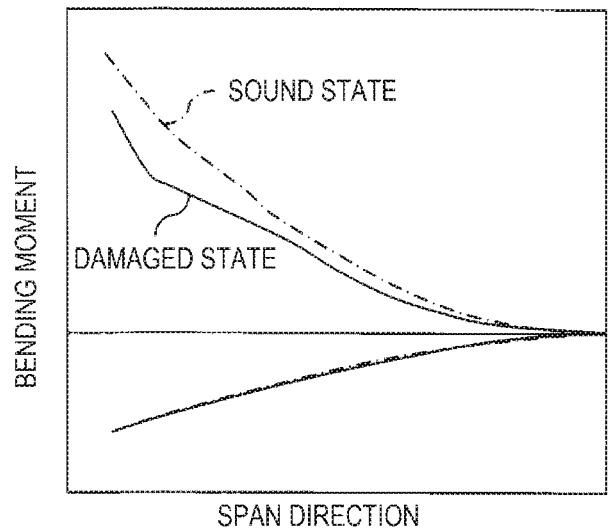
FIGS. 3A and 3B are graphs representing instances of allowable ranges of a bending moment in the span direction of a main wing.
Figure 3B:
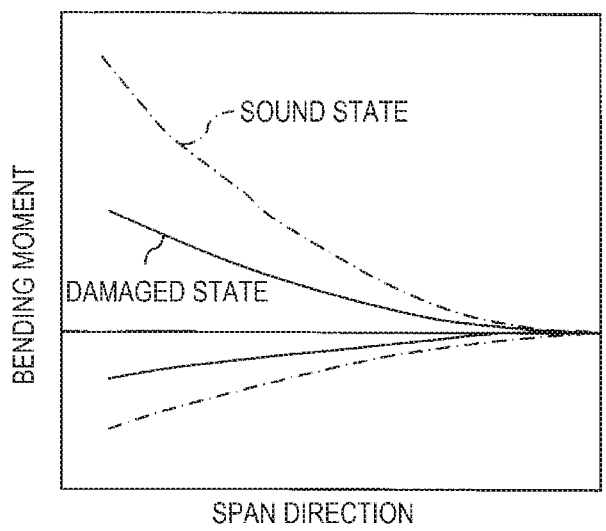

FIGS. 3A and 3B are graphs representing instances of the allowable range of the bending moment in the span direction of the main wing.

In FIGS. 3A and 3B, the vertical axis represents the bending moment of the main wing and the horizontal axis represents the span direction of the main wing. FIG. 3A illustrates the allowable range of the bending moment of the main wing before and after correction, which has been obtained by changing only the allowable internal load of the member having suffered damage. In contrast, FIG. 3B illustrates the allowable range of the bending moment of the main wing before and after correction when the allowable range of the bending moment of the entire main wing is reduced at the same reduction ratio as the reduction ratio of the strength of the member having suffered damage. In addition, in FIGS. 3A and 3B, the dot-dash line represents the allowable value of the bending moment in a sound state in which damage is not yet caused and the solid line represents the allowable value of the bending moment after damage is caused.

When the allowable range of the bending moment of the entire main wing is reduced at the same reduction ratio as the reduction ratio of the strength of the member having suffered damage as illustrated in FIG. 3B, the allowable range of the bending moment is reduced excessively even though normal members can achieve the strength. In contrast, by updating the allowable range of the bending moment of the main wing by changing only the allowable internal load of the structural member affected by damage, the reduction amount of the allowable range of the bending moment from the sound state to the damaged state can be reduced as illustrated in FIG. 3A.

The plot generation unit 4C has the function of calculating the maneuvering envelope (V-n diagram) representing the relationship between the limit load factor of an aircraft and the allowable range of the air flight velocity after occurrence of damage based on the allowable range of the external load calculated by the allowable external load calculation unit 4B and setting the flight restriction concerning at least the air flight velocity on the aircraft based on the maneuvering envelope. The V-n diagram can be calculated for each altitude of the aircraft. In this case, the flight restriction can also be set for altitude.

It should be noted here that the load factor is a value obtained by dividing the aerodynamic force applied to the aircraft during flight by the weight of the body and an indicator representing the ratio of the aerodynamic force applied to the aircraft during flight to the weight of the aircraft. In addition, the V-n diagram represents the relationship between a limit load factor n that is the upper limit of the load factor and an air flight velocity V.

The allowable range of the external load required for the structure 2 of the aircraft is calculated based on the V-n diagrams when the structure 2 is designed. Accordingly, the calculation of the V-n diagram after occurrence of damage is the reverse calculation of the calculation of the allowable range of the external load required for the structure 2 during design.

Figure 4A:
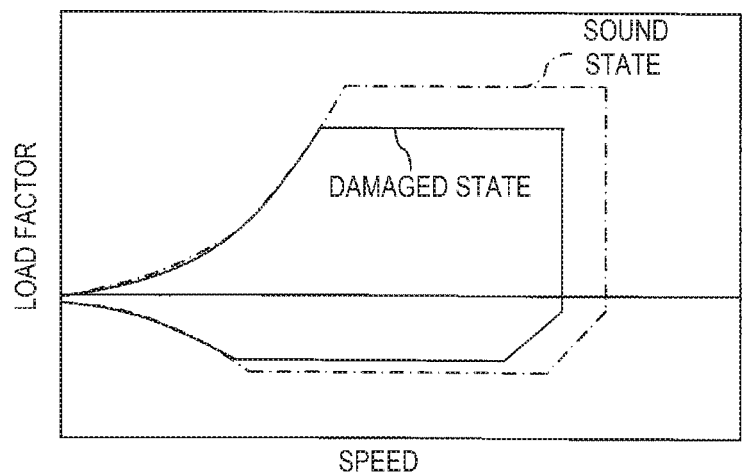
FIGS. 4A and 4B are graphs representing instances of maneuvering envelopes.
Figure 4B:
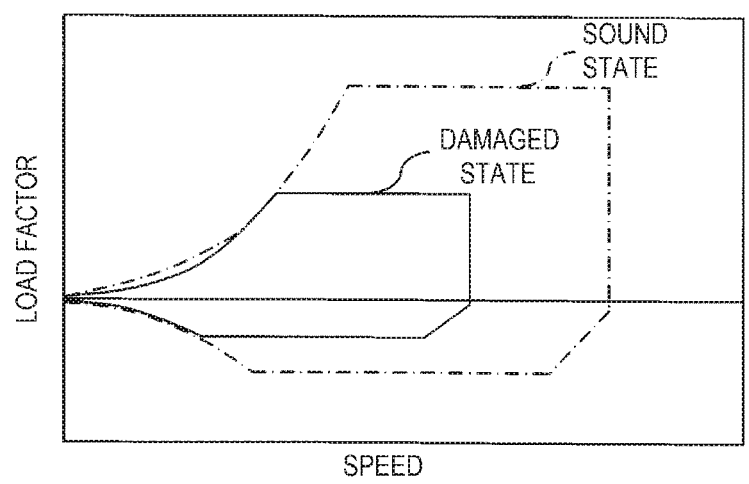

FIGS. 4A and 4B are graphs representing instances of maneuvering envelopes.

In FIGS. 4A and 4B, the vertical axis represents the limit load factor n of the aircraft and the horizontal axis represents the air flight velocity V of the aircraft. FIG. 4A is a V-n diagram before and after correction, which has been obtained by changing only the allowable internal load of the member having suffered damage. In contrast, FIG. 4B is a V-n diagram before and after correction, which has been obtained based on the allowable external load of the entire main wing reduced at the same reduction ratio as the reduction ratio of the strength of the member having suffered damage. In addition, in FIGS. 4A and 4B, the dot-dash line represents the V-n diagram in a sound state in which damage is not yet caused and the solid line represents the V-n diagram after damage is caused.

When a V-n diagram is obtained by reducing the allowable external load of the entire main wing at the same reduction ratio as the reduction ratio of the strength of the member having suffered damage as illustrated in FIG. 4B, the flight restriction is limited more than necessary. In contrast, when a V-n diagram is obtained by changing only the allowable internal load of the member having suffered damage and reducing the allowable external load, appropriate flight restriction capable of compensating the reduction in the strength of the member caused by damage can be set as illustrated in FIG. 4A.

When a V-n diagram has been obtained as information for flight restriction on the aircraft, the flight restriction on the aircraft can be performed based on the V-n diagram. That is, the flight restriction set before occurrence of damage can be updated to the flight restriction that takes damage into consideration.

The method for updating the flight restriction may be automatic update of the flight restriction or manual update of the flight restriction by the pilot. Therefore, the plot generation unit 4C has the function of automatically updating the flight restriction on the aircraft by controlling a flight control system 7 and the function of displaying flight restriction information on the display device 6.

Accordingly, when the flight restriction is automatically updated upon detection of damage, the flight restriction can be automatically updated via automatic control by the flight control system 7. That is, the flight condition of the aircraft is controlled so that flight conditions such as the altitude, the speed, and the load factor fall within the flight restriction defined by the V-n diagram. In contrast, when the flight restriction is manually updated by the pilot upon detection of damage, the pilot may reference the V-n diagram displayed on the display device 6 or the flight conditions such as the altitude, the speed, and the load factor obtained from the V-n diagram to determine the flight conditions of the aircraft.

It is possible to obtain a V-n diagram for each of the position, the size, and the degree of damage in advance and store the position, the size, and the degree of damage associated with the V-n diagrams thereof in a storage device. Then, the storage device in which information representing the relationship between the position, the size, and the degree of damage and the V-n diagrams thereof is stored can be provided as a V-n diagram database in the plot generation unit 4C. In this case, the V-n diagram corresponding to the position, the size, and the degree of damage can be obtained only by referencing the V-n diagram database.

Figure 5A:
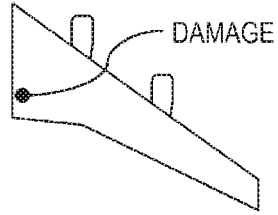
FIGS. 5A, 5B, and 5C illustrate instances of V-n diagrams obtained in the positions of damage.
Figure 5A:
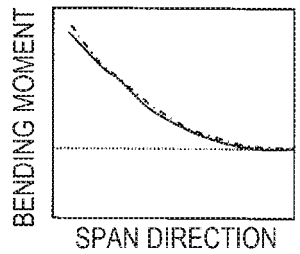
Figure 5A:
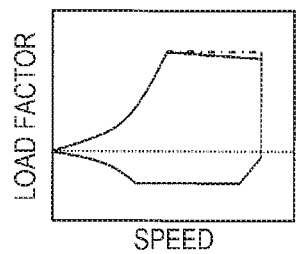
Figure 5B:
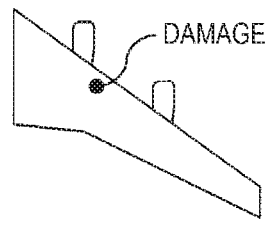
Figure 5B:
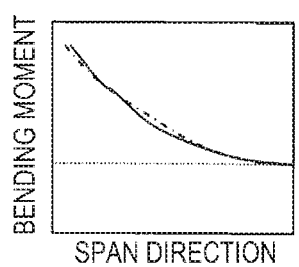
Figure 5B:
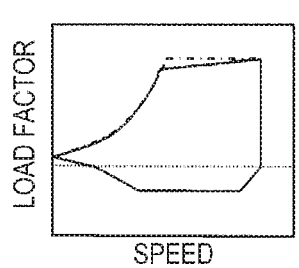
Figure 5C:
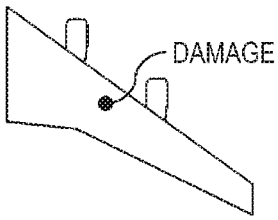
Figure 5C:
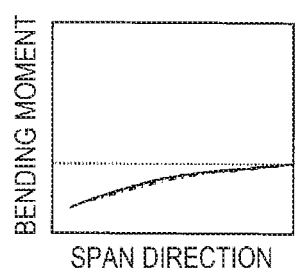
Figure 5C:
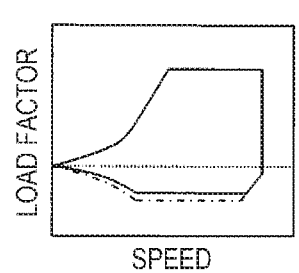

FIGS. 5A, 5B, and 5C illustrate instances of V-n diagrams obtained in the positions of damage.

As illustrated in FIGS. 5A, 5B, and 5C, the allowable range of the bending moment in the span direction of the main wing and the V-n diagram can be obtained in advance for each position of damage that may be caused to the main wing of the aircraft. FIG. 5A illustrates the case in which damage has occurred in the rear part of the wing root on the upper surface skin of the main wing, FIG. 5B illustrates the case in which damage has occurred in the front part of the central part on the upper surface skin of the main wing, and FIG. 5C illustrates the case in which damage has occurred in the central part on the lower surface skin of the main wing.

The graphs in the middle in FIGS. 5A, 5B, and 5C represent the allowable ranges of bending moments in the span direction of the main wing. Accordingly, in the graphs in the middle in FIGS. 5A, 5B, and 5C, the vertical axis represents the bending moment of the main wing and the horizontal axis represents the span direction of the main wing. In addition, the graphs on the right side in FIGS. 5A, 5C, and 5C represent V-n diagrams. Accordingly, in the graphs on the right side in FIGS. 5A, 5B, and 5C, the vertical axis represents the limit load factor n of the aircraft and the horizontal axis represents the air flight velocity V of the aircraft. In addition, in the graphs in FIGS. 5A, 5B, and 5C, the dot-dash line represents the allowable range of the bending moment of the main wind and the V-n diagram in a sound state in which damage is not yet caused and the solid line represents the allowable range of the bending moment of the main wing and the V-n diagram after damage is caused.

(Operation and Effects)

Next, the flight restriction setting method for the aircraft by the flight restriction setting system 1 will be described.

FIG. 6 is a flowchart illustrating an instance of operation of the flight restriction setting system 1 illustrated in FIG. 1.

First, in step S1, when damage is caused to the structure 2 constituting the aircraft, the damage detector 3 detects damage. The detection information of the damage including an indicator representing the degree of the damage such as the position of the damage and the size of the damage detected by the damage detector 3 is output to the flight restriction calculator 4 from the damage detector 3. That is, the flight restriction calculator 4 obtains the detection information of the damage detected by the damage detector 3.

Next, in step S2, the allowable internal load setting unit 4A sets the allowable internal loads of the members constituting the structure 2 having suffered damage based on the position and the degree of the damage. That is, the allowable internal loads of the structural members that have been changed because the structure 2 has suffered damage are set.

Next, in step S3, the allowable external load calculation unit 4B calculates the allowable external load applicable to the entire structure 2 based on the allowable internal loads applicable to the structural members constituting the structure 2. As a specific instance, when the structure 2 is a main wing, the allowable value of a shearing force distribution, the allowable value of a bending moment distribution, and the allowable value of a torque distribution in the span direction of the main wing are calculated.

Next, in step S4, the plot generation unit 4C calculates a V-n diagram for each altitude based on the allowable external load applicable to the structure 2. That is, the plot generation unit 4C calculates a V-n diagram representing the range that can be used as the flight condition in the state in which the structure 2 has suffered damage.

Next, in step S5, the plot generation unit 4C sets the flight restriction on the aircraft according to the degree of damage and provides the set flight condition. For instance, the plot generation unit 4C displays, on the display device 6, the flyable altitude, speed, and limit load factor that are obtained based on the calculated V-n diagram for each altitude. This enables the pilot of the aircraft to fly the aircraft under the conditions newly set in consideration of the damage of the structure 2.

Alternatively, the plot generation unit 4C can automatically control the flight control system 7 so that the aircraft flies under the flight restriction that is based on the calculated V-n diagram for each altitude. That is, it is possible to automatically lock the altitude, the speed, and the limit load factor so that these flight conditions do not exceed the allowable values. This enables the aircraft to fly safely even after the structure 2 has suffered damage.

(Effects)

In the flight restriction setting system 1 and the flight restriction setting method described above, when the structure 2 of the aircraft suffers damage and the strength thereof is partially reduced, optimum flight conditions can be set according to the degree of the damage.

In related art, when the structure 2 suffers damage and the strength of a particular structural member is reduced by, for instance, 50%, the pilot performs flight by imposing flight restriction so that the external load applied to the entire structure 2 is reduced to 50%. That is, in the related art, when the strength of a part of the structure 2 is reduced by damage, the external load of the entire structure 2 is restricted at the same ratio as the reduction ratio of the strength of the part, as an operational rule. However, if uniform flight restriction is imposed according to the reduction in the strength of the structural member having suffered damage, excess flight restriction is imposed even when the structural member has a margin for strength.

In contrast, the flight restriction setting system and the flight restriction setting method calculate an allowable internal load distribution according to the reduction in the strength of the structural member having suffered damage and then calculate an allowable external load distribution based on the obtained allowable internal load distribution. That is, the allowable external load for the entire structure 2 is calculated again based on the strength of the structural member reduced locally due to damage and the strengths of almost all structural members with no damage. Then, a V-n diagram is calculated based on the allowable external load calculated again.

Therefore, the flight restriction setting system 1 and the flight restriction setting method can set flight restriction such as an appropriate altitude, speed, and load factor according to the degree of damage even when the structure suffers damage due to a hit, lightning, or a bird-strike during flight of the aircraft. For instance, when the strength required for structural member having suffered damage is the strength required only for a particular flight state, flight restriction may be set so that the external load is reduced only for the particular flight state. This can return the aircraft safely without expanding damage.

In addition, even when the strength margin of the structural member becomes insufficient because the structure 2 suffers damage, it is possible to immediately grasp the flight condition required to obtain the strength margin of the structural member and change the flight condition.

Other Examples

Although a particular example has been described above, the described example is only an instance and does not limit the scope of the present invention. The novel methods and devices described here may be practiced in various other forms. In addition, in the forms of the methods and devices described here, various omissions, replacements, and changes may be made without departing from the spirit of the present invention. The appended claims and the equivalents thereof include such various forms and modified examples, which are included in the scope and the spirit of the present invention.

The invention claimed is:

1. A flight restriction setting system comprising:
a damage detection system including a damage sensor configured to detect damage caused to a structure constituting an aircraft, wherein the damage caused to the structure is detected by disposing a plurality of strain sensors in the structure and obtaining a distribution of a strain generated in the structure; and
a flight restriction calculator system including a processor configured to set flight restriction on the aircraft according to a degree of the damage detected by the damage detection system, wherein the flight restriction calculator system comprises a storage device that stores information representing a relationship between a plurality of positions and sizes of a plurality of damages that may be caused to the structure and a plurality of allowable ranges of internal loads applicable to members constituting the structure, wherein the damage detection system is configured to determine a position and a size of the damage based on a detection signal from the damage sensor, wherein the processor is configured to: retrieve, from the storage device, the allowable ranges of the internal loads applicable to the members constituting the structure after occurrence of the damage associated with the position and the size of the damage determined by the damage detection system based on the information representing the relationship stored in the storage device, set the flight restriction on the aircraft based on the retrieved allowable ranges of the internal loads, calculate an allowable range of an external load applicable to the structure after the occurrence of the damage by repeating calculation that calculates the internal loads to be applied to the members constituting the structure when the external load is applied to the structure until the calculated internal loads fall within the allowable ranges of the internal loads while reducing the external load based on the allowable ranges of the internal loads applicable to the members constituting the structure after the occurrence of the damage, and set the flight restriction on the aircraft based on the calculated allowable range of the external load.

2. The flight restriction setting system according to claim 1, wherein the processor calculates an allowable range of at least one of a distribution of a shearing force, a distribution of a bending moment, or a distribution of a torque as an allowable range of an external load.

3. The flight restriction setting system according to claim 2, wherein the processor calculates a maneuvering envelope representing a relationship between a limit load factor of the aircraft after the occurrence of the damage and an allowable range of an air flight velocity based on the allowable range of the external load, and sets the flight restriction on the aircraft based on the calculated maneuvering envelope, the flight restriction concerning at least the air flight velocity.

4. The flight restriction setting system according to claim 3, wherein the processor calculates the maneuvering envelope for each altitude of the aircraft, and sets the flight restriction on the aircraft further including the altitude based on the calculated maneuvering envelope for each altitude.

5. The flight restriction setting system according to claim 1, wherein the processor calculates a maneuvering envelope representing a relationship between a limit load factor of the aircraft after the occurrence of the damage and an allowable range of an air flight velocity based on the allowable range of the external load, and sets the flight restriction on the aircraft based on the calculated maneuvering envelope, the flight restriction concerning at least the air flight velocity.

6. The flight restriction setting system according to claim 5, wherein the processor calculates the maneuvering envelope for each altitude of the aircraft, and sets the flight restriction on the aircraft further including the altitude based on the calculated maneuvering envelope for each altitude.

7. A flight restriction setting method comprising:

detecting damage caused to a structure constituting an aircraft, using a damage detection system comprising a damage sensor, wherein the damage caused to the structure is detected by disposing a plurality of strain sensors in the structure and obtaining a distribution of a strain generated in the structure;

setting flight restriction on the aircraft according to a degree of the damage detected by the damage detection system, storing, by a storage device, information representing a relationship between a plurality of positions and sizes of a plurality of damages that may be caused to the structure and a plurality of allowable ranges of internal loads applicable to members constituting the structure;

determining, by the damage detection system, a position and a size of the damage based on a detection signal from the damage sensor;

retrieving, from the storage device, the allowable ranges of the internal loads applicable to the members constituting the structure after occurrence of the damage associated with the position and the size of the damage determined by the damage detection system based on the information representing the relationship stored in the storage device;

setting the flight restriction on the aircraft based on the retrieved allowable ranges of the internal loads;

calculating an allowable range of an external load applicable to the structure after the occurrence of the damage by repeating calculation that calculates the internal loads to be applied to the members constituting the structure when the external load is applied to the structure until the calculated internal loads fall within the allowable ranges of the internal loads while reducing the external load based on the allowable ranges of the internal loads applicable to the members constituting the structure after the occurrence of the damage; and setting the flight restriction on the aircraft based on the calculated allowable range of the external load.

8. A non-transitory storage medium that includes a flight restriction setting program embodied therein, the restriction setting program causing, when executed by a computer, the computer to implement a process, the process comprising:

obtaining damage caused to a structure constituting an aircraft from a damage detection system comprising a damage sensor, the damage being detected by the damage detection system, wherein the damage caused to the structure is detected by disposing a plurality of strain sensors in the structure and obtaining a distribution of a strain generated in the structure;

setting flight restriction on the aircraft according to a degree of the obtained damage;

storing, by a storage device, information representing a relationship between a plurality of positions and sizes of a plurality of damages that may be caused to the structure and a plurality of allowable ranges of internal loads applicable to members constituting the structure;

determining, by the damage detection system, a position and a size of the damage based on a detection signal from the damage sensor;

retrieving, from the storage device, the allowable ranges of the internal loads applicable to the members constituting the structure after occurrence of the damage associated with the position and the size of the damage determined by the damage detection system based on the information representing the relationship stored in the storage device;

setting the flight restriction on the aircraft based on the retrieved allowable ranges of the internal loads;

calculating an allowable range of an external load applicable to the structure after the occurrence of the damage by repeating calculation that calculates the internal loads to be applied to the members constituting the structure when the external load is applied to the structure until the calculated internal loads fall within the allowable ranges of the internal loads while reducing the external load based on the allowable ranges of the internal loads applicable to the members constituting the structure after the occurrence of the damage; and setting the flight restriction on the aircraft based on the calculated allowable range of the external load.

9. A flight restriction setting system comprising:

a damage detection system including a damage sensor configured to detect damage caused to a structure constituting an aircraft, wherein the damage caused to the structure is detected by disposing a plurality of ultrasonic oscillators as the damage sensor in the structure and obtaining a distribution of the waveform of ultrasound generated in the structure; and a flight restriction calculator system including a processor configured to set flight restriction on the aircraft according to a degree of the damage detected by the damage detection system, wherein the flight restriction calculator system comprises a storage device that stores information representing a relationship between a plurality of positions and sizes of a plurality of damages that may be caused to the structure and a plurality of allowable ranges of internal loads applicable to members constituting the structure, wherein the damage detection system is configured to determine a position and a size of the damage based on a detection signal from the damage sensor, wherein the processor is configured to: retrieve, from the storage device, the allowable ranges of the internal loads applicable to the members constituting the structure after occurrence of the damage associated with the position and the size of the damage determined by the damage detection system based on the information representing the relationship stored in the storage device, set the flight restriction on the aircraft based on the retrieved allowable ranges of the internal loads, calculate an allowable range of an external load applicable to the structure after the occurrence of the damage by repeating calculation that calculates the internal loads to be applied to the members constituting the structure when the external load is applied to the structure until the calculated internal loads fall within the allowable ranges of the internal loads while reducing the external load based on the allowable ranges of the internal loads applicable to the members constituting the structure after the occurrence of the damage, and set the flight restriction on the aircraft based on the calculated allowable range of the external load of the aircraft after the occurrence of the damage and an allowable range of an air flight velocity based on the allowable range of the external load, and set the flight restriction on the aircraft based on the calculated maneuvering envelope, the flight restriction concerning at least the air flight velocity.

10. The flight restriction setting system according to claim 9, wherein the processor calculates an allowable range of at least one of a distribution of a shearing force, a distribution of a bending moment, or a distribution of a torque as an allowable range of an external load.

11. The flight restriction setting system according to claim 10, wherein the processor calculates a maneuvering envelope representing a relationship between a limit load factor of the aircraft after the occurrence of the damage and an allowable range of an air flight velocity based on the allowable range of the external load, and sets the flight restriction on the aircraft based on the calculated maneuvering envelope, the flight restriction concerning at least the air flight velocity.

12. The flight restriction setting system according to claim 11, wherein the processor calculates the maneuvering envelope for each altitude of the aircraft, and sets the flight restriction on the aircraft further including the altitude based on the calculated maneuvering envelope for each altitude.

13. The flight restriction setting system according to claim 12, wherein the processor calculates a maneuvering envelope representing a relationship between a limit load factor of the aircraft after the occurrence of the damage and an allowable range of an air flight velocity based on the allowable range of the external load, and sets the flight restriction on the aircraft based on the calculated maneuvering envelope, the flight restriction concerning at least the air flight velocity.

14. The flight restriction setting system according to claim 13, wherein the processor calculates the maneuvering envelope for each altitude of the aircraft, and sets the flight restriction on the aircraft further including the altitude based on the calculated maneuvering envelope for each altitude.

15. A flight restriction setting method comprising:

detecting damage caused to a structure constituting an aircraft, using a damage detection system comprising a damage sensor, wherein the damage caused to the structure is detected by disposing a plurality of ultrasonic oscillators as the damage sensor in the structure and obtaining a distribution of the waveform of ultrasound generated in the structure;

setting flight restriction on the aircraft according to a degree of the damage detected by the damage detection system, storing, by a storage device, information representing a relationship between a plurality of positions and sizes of a plurality of damages that may be caused to the structure and a plurality of allowable ranges of internal loads applicable to members constituting the structure;

determining, by the damage detection system, a position and a size of the damage based on a detection signal from the damage sensor;

retrieving, from the storage device, the allowable ranges of the internal loads applicable to the members constituting the structure after occurrence of the damage associated with the position and the size of the damage determined by the damage detection system based on the information representing the relationship stored in the storage device;

setting the flight restriction on the aircraft based on the retrieved allowable ranges of the internal loads;

calculating an allowable range of an external load applicable to the structure after the occurrence of the damage by repeating calculation that calculates the internal loads to be applied to the members constituting the structure when the external load is applied to the structure until the calculated internal loads fall within the allowable ranges of the internal loads while reducing the external load based on the allowable ranges of the internal loads applicable to the members constituting the structure after the occurrence of the damage; and setting the flight restriction on the aircraft based on the calculated allowable range of the external load of the aircraft after the occurrence of the damage and an allowable range of an air flight velocity based on the allowable range of the external load, and setting the flight restriction on the aircraft based on the calculated maneuvering envelope, the flight restriction concerning at least the air flight velocity.

16. A non-transitory storage medium that includes a flight restriction setting program embodied therein, the restriction setting program causing, when executed by a computer, the computer to implement a process, the process comprising:

obtaining damage caused to a structure constituting an aircraft from a damage detection system comprising a damage sensor, the damage being detected by the damage detection system, wherein the damage caused to the structure is detected by disposing a plurality of ultrasonic oscillators as the damage sensor in the structure and obtaining a distribution of the waveform of ultrasound generated in the structure;

setting flight restriction on the aircraft according to a degree of the obtained damage;

storing, by a storage device, information representing a relationship between a plurality of positions and sizes of a plurality of damages that may be caused to the structure and a plurality of allowable ranges of internal loads applicable to members constituting the structure;

determining, by the damage detection system, a position and a size of the damage based on a detection signal from the damage sensor;

retrieving, from the storage device, the allowable ranges of the internal loads applicable to the members constituting the structure after occurrence of the damage associated with the position and the size of the damage determined by the damage detection system based on the information representing the relationship stored in the storage device;

setting the flight restriction on the aircraft based on the retrieved allowable ranges of the internal loads;

calculating an allowable range of an external load applicable to the structure after the occurrence of the damage by repeating calculation that calculates the internal loads to be applied to the members constituting the structure when the external load is applied to the structure until the calculated internal loads fall within the allowable ranges of the internal loads while reducing the external load based on the allowable ranges of the internal loads applicable to the members constituting the structure after the occurrence of the damage; and setting the flight restriction on the aircraft based on the calculated allowable range of the external load of the aircraft after the occurrence of the damage and an allowable range of an air flight velocity based on the allowable range of the external load, and setting the flight restriction on the aircraft based on the calculated maneuvering envelope, the flight restriction concerning at least the air flight velocity.

\* \* \* \* \*